United States Patent [19]
Münzmay et al.

[11] Patent Number: 5,616,623
[45] Date of Patent: Apr. 1, 1997

[54] PROCESS FOR THE DECOMPOSTION OF POLYURETHANE PLASTICS

[75] Inventors: Thomas Münzmay, Dormagen; Peter Fuhrmann, Köln; Franz Lamla, Dormagen; Walter Meckel, Neuss; Werner Rasshofer, Köln, all of Germany

[73] Assignee: Bayer Aktiengesellschaft, Leverkusen, Germany

[21] Appl. No.: 560,565

[22] Filed: Nov. 20, 1995

[30] Foreign Application Priority Data

Nov. 29, 1994 [DE] Germany ............ 44 42 379.9

[51] Int. Cl.⁶ ........................................ C08J 11/04
[52] U.S. Cl. .......................... 521/49.5; 521/49
[58] Field of Search ........................ 521/49, 49.5

[56] References Cited

U.S. PATENT DOCUMENTS 4,742,095  5/1988  Markusch et al. ............... 523/322

FOREIGN PATENT DOCUMENTS 2347299  4/1975  Germany.

*Primary Examiner*—Morton Foelak
*Attorney, Agent, or Firm*—Joseph C. Gil; Lyndanne M. Whalen

[57] ABSTRACT

A process for the decomposition of polyurethane plastic waste materials in which a compound containing at least two isocyanate-reactive hydrogen atoms (e.g., glycol) and polyurethane plastic, together with 2 to 20 times the amount of previously regenerated material, are treated in a mixing and comminution device.

4 Claims, 2 Drawing Sheets

PROCESS FOR THE DECOMPOSTION OF POLYURETHANE PLASTICS

BACKGROUND OF THE INVENTION

The present invention relates to a new process for the decomposition of polyurethane plastics.

It is known that plastics produced by the polyisocyanate addition polymerization process can be broken down into low molecular weight constituents and converted into a soluble form by suitable reactive solvents. Particular attention has been given to the glycolytic decomposition of polyurethane plastic and foam waste materials, sometimes with the addition of amines, amino alcohols and/or catalysts. Such decomposition processes are disclosed, for example, in German Auslegeschriften or Offenlegungsschriften [patent applications laid open to public inspection] 1,110,405; 2,238,109; 2,304,444; 2,414,091; 2,516,863; 2,557,172; 2,738,572; 2,759,054; 2,902,509; 3,435,014 and 3,702,495; and U.S. Pat. Nos. 3,632,530; 4,014,809; 4,110,266; 4,159, 972 and 4,162,995.

In view of the large number of disclosures directed to the decomposition of such materials, it is apparent that none of the known processes provides a satisfactory solution to the problem. In fact, the breadth of commercial application and the cost-effectiveness of the processes described in the prior art are restricted due to one or more of the following disadvantages:

1. The dissolution or reaction periods, which generally last for several hours, result in unsatisfactory space-time yields and limit the cost-effectiveness.

2. The amounts of diol required for the dissolution or decomposition of polyurethane plastic waste materials are often equal to or far in excess of the amount of waste material to be decomposed which creates a burden with respect to the amount of the decomposition fraction to be recycled.

3. The long reaction times (2 to 12 hours) and reaction temperatures of up to 250° C. result in unwanted side reactions and in degradation of the regenerated polyols.

4. The use of catalysts in the decomposition reaction leads to difficulties when the regenerated polyols are subsequently used in an isocyanate addition polymerization process because these catalysts remain in the regenerated polyol and result in diverse catalytic effects (e.g., trimerization or dimerization of the isocyanates or conversion of the isocyanate into a carbodiimide, etc.).

5. Extraneous polymers present in the polyurethane waste material, particularly thermoplastics such as polypropylene, ABS, polystyrene or polycarbonate are not decomposed under glycolysis conditions. These extraneous polymers melt and contaminate or damage installations and lines.

6. During the glycolysis of polyurethane plastic waste materials of low density, such as hard and/or soft foams, in conventional stirred vessels, a large volume of foam (density about 40 to 80 g/l) must be dissolved in a small volume of glycol (density about 1100 g/l).

In order to circumvent the above-enumerated problems, various processes which avoid these disadvantages have been described.

DE 3,232,461 discloses a process for the continuous glycolytic decomposition of polyurethane plastic waste materials in screw-conveying machines. This process avoids the above-enumerated disadvantages and also makes it possible to process polyurethane plastic waste materials of low density. The disadvantages of this process are the high cost of creating and operating a screw reactor of this type and the peripheral devices associated therewith.

DE-C 4,030,639 and DE-A 4,132,282 describe the use of a multi-chamber gyro device (ultrasonic mill) for liquefying polyurethane plastic waste material steeped in solvents. These processes are limited to polyurethane foamed waste material because the material has to be steeped in suitable solvents before liquefaction. The material to be regenerated in these processes must therefore have a large surface area. In contrast, solid polyurethane plastic waste materials have to be ground to small particle sizes, which makes the cost-effectiveness of the process open to question.

Another disadvantage of the ultrasonic milling process is that polyurethane plastic waste materials are capable of absorbing large amounts of solvents such as polyols without forming a liquid mixture that can be pumped. This phenomenon is particularly pronounced with cellular polyurethane plastic waste materials (foamed materials) which, like a sponge, can absorb many times their own weight of solvent without forming a product that is capable of flow or that can be pumped. This means that only a small recycle fraction can be obtained.

One possible way of circumventing this problem is described in EP-A 546 415. In this disclosed process, the polyurethane plastic waste materials are glycolyzed with a large quantitative excess of polyol. This excess polyol is subsequently distilled off. This process consumes more energy than other prior art processes because (i) a relative excess of polyol has to be heated to the glycolysis temperature, and (ii) the excess polyol subsequently has to be removed by distillation.

SUMMARY OF THE INVENTION

It is an object of the present invention to provide a process for regenerating polyurethane plastic waste materials by dissolution and/or decomposition in media which react with isocyanates which process has a significantly increased recycle fraction, shorter residence times than prior art processes and a low installation cost.

It is also an object of the present invention to provide regenerated products which are suitable for reuse as raw material components for the production of polyurethane plastics.

These and other objects which will be apparent to those skilled in the art are accomplished by mixing and comminuting (1) a polyurethane plastic, (2) a compound containing at least two isocyanate-reactive hydrogen atoms and (3) a regeneration product prepared by cleaving a polyurethane plastic with a low molecular weight compound containing at least two isocyanate-reactive hydrogen atoms in a high speed device which generates high shear forces between its rotor and stator. The materials (1), (2) and (3) are combined in amounts such that the amount of (3) is from about 2 to about 20 times the weight of (1) plus (2).

DETAILED DESCRIPTION OF THE PRESENT INVENTION

Figure 1:
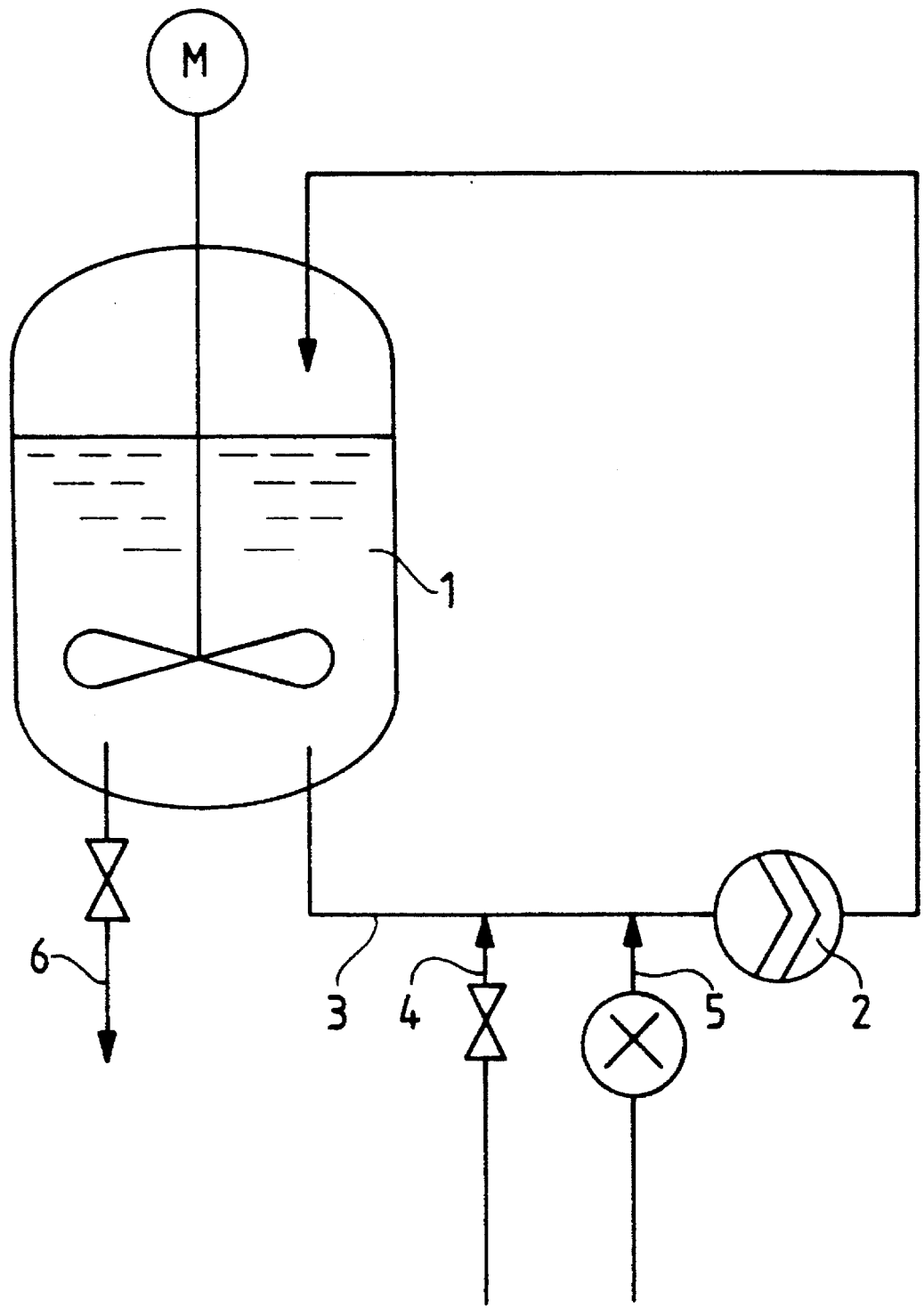
FIG. 1 illustrates an apparatus suitable for carrying out the process of the present invention.

The present invention relates to a process for regenerating polyurethane plastics by cleavage. In this process, a low molecular weight compound containing at least two isocyanate-reactive hydrogen atoms is used to form a regenerated material containing isocyanate-reactive hydrogen atoms. In the process of the present invention, a polyurethane plastic and at least one compound containing isocyanate-reactive hydrogen atoms are mixed and comminuted with 2 to 20 times, preferably 5 to 12 times, their amount by weight with regenerated material containing isocyanate-reactive hydrogen atoms. This mixing and comminution is carried out in a device (e.g., a pump) at high speed which device generates high shear forces between its rotor and stator.

Any of the known polyurethane plastics, particularly polyurethane plastic waste materials, may be used as the polyurethane plastic in the process of the present invention. These polyurethane plastics may contain inorganic or organic reinforcing or modifying components, such as glass fibers or other thermoplastic, thermosetting or resilient plastics. One of the advantages of the regeneration process of the present invention is its ability to regenerate a variety of plastic waste materials containing polyurethanes without sorting those waste materials prior to treatment. The polyurethane plastics waste materials useful in the process of the present invention may be in the form of solid polyurethane or polyurethane foam. The use of the high recycle fraction is particularly advantageous when polyurethane foam is being regenerated in accordance with the process of the present invention. Polyurethane foamed materials are preferably used after they have been reduced into lump form or flock form with largest dimension of up to 50 mm, preferably up to 20 mm.

Compounds which are suitable as compounds containing at least two isocyanate-reactive hydrogen atoms include polyhydric alcohols having molecular weights (as determined by end group analysis) in the range of from about 62 to about 10,000, preferably from about 62 to about 5000. Mixtures of such alcohols may also be used. Specific examples of compounds having at least two isocyanate-reactive hydrogen atoms which are useful in the process of the present invention include ethylene glycol, diethylene glycol, tri- and tetraethylene glycol, 1,3-propylene glycol, 1,2-propylene glycol, di-, tri- and tetra-1,2-propylene glycol, 1,3- or 1,4-butanediol, as well as higher polyhydric alcohols such as glycerine, trimethylolpropane or pentaerythritol. Polyhydric alcohols of higher molecular weight within the above-mentioned range which are particularly suitable for use in the practice of the present invention include polymers and copolymers of ethylene oxide and/or propylene oxide which are started on di- and/or polyfunctional alcohols such as those mentioned above, or on water or on sugars. Examples of other polyhydric alcohols of higher molecular weight which are useful in the practice of the present invention include polytetrahydrofuran diols, polyester polyols, and polycarbonate polyols.

Other compounds containing isocyanate-reactive hydrogen atoms which are suitable for use in the practice of the present invention include: amino alcohols such as ethanolamine, diethanolamine, triethanolamine, 1,3-propanolamine, 1,2-propanolamine, and tripropanolamine; amines such as dibutylamine and morpholine; polyamines such as ethylenealiamine, diethylenetriamine, hexamethylenediamine and isophoronealiamine; and polyamines of higher molecular weight which are derived from polypropylene oxide polyols by replacing the terminal hydroxyl groups by primary amino groups (such as those which are commercially available under the name Jeffamine™ from Texaco Inc.). These isocyanate-reactive materials may, of course, also be used in the form of mixtures.

Low molecular weight alcohols are the preferred isocyanate-reactive materials, particularly ethylene glycol, diethylene glycol and dipropylene glycol.

The polyurethane plastics and the compounds containing at least two isocyanate-reactive hydrogen atoms are preferably used in a weight ratio of polyurethane plastic to isocyanate-reactive compound of from about 5:1 to about 1:1, most preferably from about 4:1 to about 2:1.

Regeneration of the polyurethane plastics is preferably conducted at a temperature of from about 100° to about 220° C.

Suitable mixing and comminution devices are pumps which run at high speed and which generate high shear forces between the rotor and stator include those mixing and comminution pumps based on the rotor/stator principle that operate at speeds between 500 and 5000 rpm. Examples of such pumps are those which are commercially available under the Gorator® trade mark from Hoelschertechnic-Gorator GmbH, Herne, Federal Republic of Germany, or under the name Supraton-Maschine from Deutsche Supraton Bruchmann & Zucker KG, Düsseldorf, Federal Republic of Germany.

The process of the present invention is preferably carried out on a continuous basis. This may be accomplished, for example, by supplying regenerated material from a prior regeneration of polyurethane plastic from a supply vessel and introducing polyurethane plastic to be regenerated and the compound containing at least two isocyanate-reactive hydrogen atoms into the stream of this previously regenerated polyurethane material prior to introduction of the stream containing regenerated material, polyurethane material to be regenerated and isocyanate-reactive compound to the mixing and comminution device. The newly formed regenerated material is withdrawn from the vessel in which the regeneration process is conducted as the stream containing material to be regenerated is introduced. The isocyanate-reactive material which has thus been regenerated is preferably withdrawn at a flow rate which is from about 0.01 to about 1 times the flow rate of the stream being introduced to the mixing and comminuting device.

In another embodiment of the process of the present invention, the compound containing at least two isocyanate-reactive hydrogen atoms and the polyurethane plastics to be regenerated may be introduced into the supply vessel containing previously regenerated material. A fraction of previously regenerated material is then transferred out of this vessel downstream of the mixing and comminution pump and recycled. The remaining fraction of regenerated material containing polyurethane plastic to be regenerated and isocyanate-reactive material is transferred to the mixing and comminution device.

In another embodiment of the present invention, the polyurethane plastic and compound containing at least two isocyanate-reactive hydrogen atoms are premixed and thereafter mixed with the previously regenerated material.

The invention is described in more detail below with reference to the apparatus shown in FIG. 1.

The previously regenerated material is maintained in stirred supply vessel 1. This regenerated material is pumped round via line 3 by means of mixing and comminution pump 2. The compound containing at least two isocyanate-reactive hydrogen atoms is fed into the pumped-round, regenerated material via line 4 and polyurethane waste materials are introduced via line 5 by means of a cellular wheel lock or metering screw. In addition, regenerated material is transferred outward from supply vessel 1 at the same rate as the rate at which new regenerated material is formed. The supply vessel 1 may have a volume which corresponds to 1/100 to 1 times the hourly pump output of the mixing and comminution pump 2.

Figure 2:
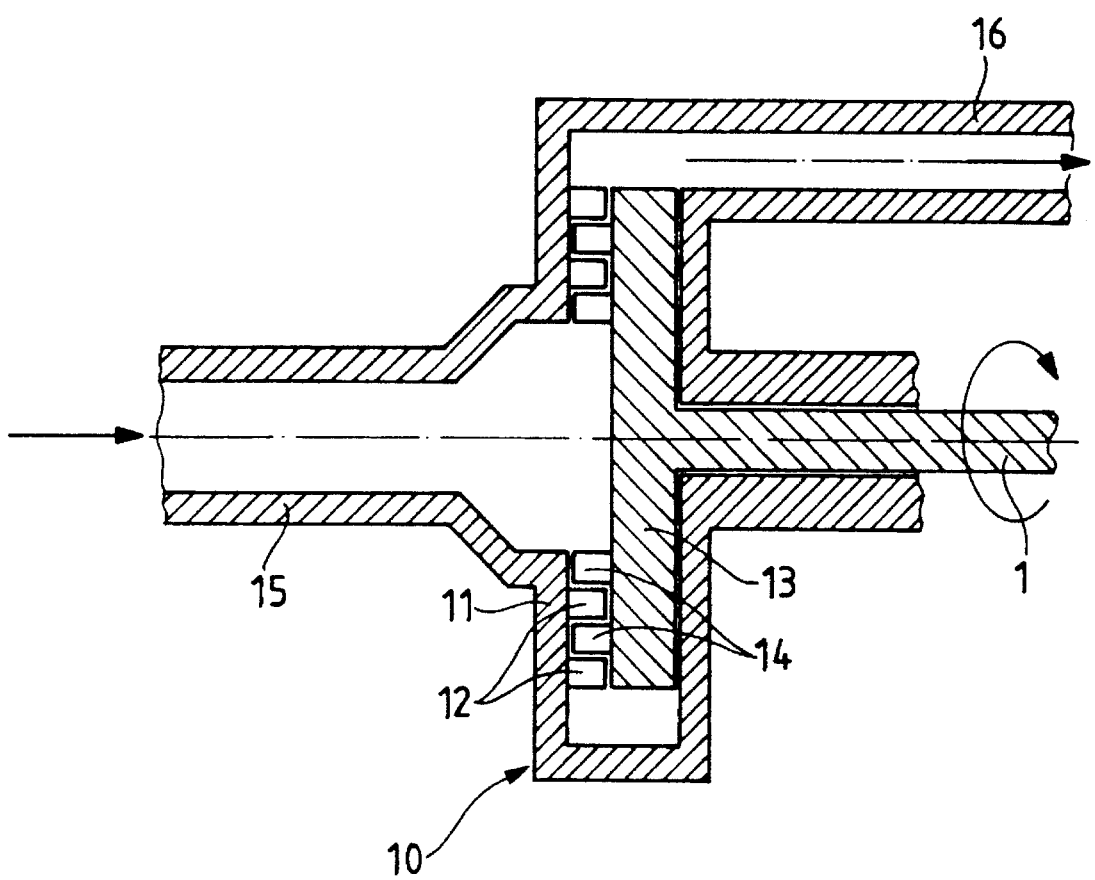
FIG. 2 illustrates the principle of the mixing and comminuting apparatus.

The principle of a mixing and comminuting pump is described in FIG. 2. The pump 2 consists of a stator 11 with stator shear elements 12 and a rotor 13 with rotor shear elements 14. The rotor 13 is rotated around axis 17 with high speed, say between 5,000 and 20,000 rpm. The mixture is supplied through pipe 15, forced through shear elements 12, 14, whereby high shear is applied to the mixture, and withdrawn through pipe 16.

Having thus described our invention, the invention is described in more detail in the Examples given below.

EXAMPLES

Example 1

An apparatus corresponding to that illustrated in FIG. 1 was used.

a) Start-up 45 kg diethylene glycol were placed in vessel 1, heated to 180° C. and pumped round via line 3 by means of a Supraton machine 2 (type 205, delivery capacity 5000 l water/hour) at a circulation rate of 20 kg/min. 1.5 kg per minute of a polyether foam having a density of 200 kg/m$^3$ containing 1.2 moles/kg of urethane groups and 1.35 moles/kg of urea groups was metered (after size reduction to a maximum flock size of 20 mm diameter) into the diethylene glycol stream via line 5. After 50 minutes, 0.3 kg/min of diethylene glycol were additionally metered in via line 4. After a further 50 minutes, the metered addition of diethylene glycol was increased to 0.6 kg/min and 2.1 kg/min of regenerated material were simultaneously drawn off via line 6.

b) Steady-state Operation

Thereafter, 1.5 kg/min of polyurethane foam and 0.6 kg/min of diethylene glycol were fed into line 3 and 2.1 kg/min of glycolyzate were drawn off. The temperature in vessel 1 was maintained at 180° C. The glycolyzate product had a constant OH number of 295, a constant NH number of 29, and a constant viscosity of 900 mPa's (at 50° C.).

Example 2

Example 1 was repeated with the exception that a granular polyurethane urea material which was reinforced with glass fiber having a density of 1.26 kg/m$^3$ (produced in accordance with Example 2 of DE-A 2,622,951) and a particle size of 8 mm, was used instead of the polyether foam that had been used in Example 1. In steady-state operation, the glycolyzate product had a constant OH number of 305, a constant NH number of 35, and a constant viscosity of 3600 mPa's (at 50° C.).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for generating isocyanate-reactive materials from polyurethane plastics comprising mixing and comminuting 1) a polyurethane plastic, 2) a compound consisting of at least two isocyanate-reactive hydrogen atoms and 3) a regeneration product prepared by cleaving a polyurethane plastic with a compound containing at least two isocyanate-reactive hydrogen atoms in amounts such that the weight of 3) is from about 2 to about 20 times the weight of 1) plus 2) by at high speed by means of a device which generates high shear forces between its rotor and stator in which the isocyanate-reactive material generated during the process is withdrawn from the reaction mixture.

2. The process of claim 1 in which 1) and 2) are continuously added to a stream of 3) which has been pumped from a heated vessel and in which isocyanate-reactive material generated during the process is withdrawn from the reaction mixture.

3. The process of claim 2 in which the isocyanate-reactive material generated during the process is withdrawn at a flow rate which is from about 0.01 to about 1 times the flow rate of 3).

4. The process of claim 1 in which 1) and 2) are premixed before being mixed with 3).

* * * * *